DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

983 O.G. 401

T893,003

FLUORESCENT MULTICOLOR ADDITIVE SYSTEM

Robert Joseph Tuite, % Eastman Kodak Company, Kodak Park Division, Rochester, N.Y. 14650

Filed Sept. 8, 1970, Ser. No. 70,546

Int. Cl. C09k *1/02;* G03c *1/92*

U.S. Cl. 96—82

No Drawing. 12 Pages Specification

A novel additive color system which is colorless under visible light but which is transformed in the additive manner into the visible primary colors upon exposure to ultraviolet radiation so as to produce the complete range of colors of the visible spectrum. With respect to photographic products the system contains a blue emitting optical brightener, a colorless terbium complex or chelate which emits in the green region of the visible spectrum and a colorless europium complex or chelate which emits in the red region of the visible spectrum. The luminescent materials all absorb in the UV region of the spectrum (330–380 nm.), but can be superposed in separate layers without undue loss in luminescence intensity resulting from absorption of the existing UV radiation by the overlying layers. The color system can be typically employed in photo-mechanical image reproductions; as inks; as xerographic toners; in photopolymerizable coatings; in conventional color photographic reflection and transparent prints in order to provide highlight masks for the unwanted absorptions of the cyan, magenta and yellow dyes and to provide extended tonal range; and in contact screens. The system can also be applied to non-mechanical uses, such as in paints, pigments, inks, pencils, crayons, etc. for sketching; in yarn, glass, etc. for unusual and useful effects.

The photographic silver halide emulsions and elements containing the optical brighteners and rare earth complexes can be chemically sensitized, e.g., with noble metal sensitizers alone or in combination with sulfur or selenium sensitizers. They can contain spectral sensitizers, incorporated color-forming couplers, incorporated developing agents, antifoggants, hardeners plasticizers, coating aids, and other suitable photographic addenda, such as described in U.S. Pat. 3,297,446 (columns 4–9).